Figure 1:
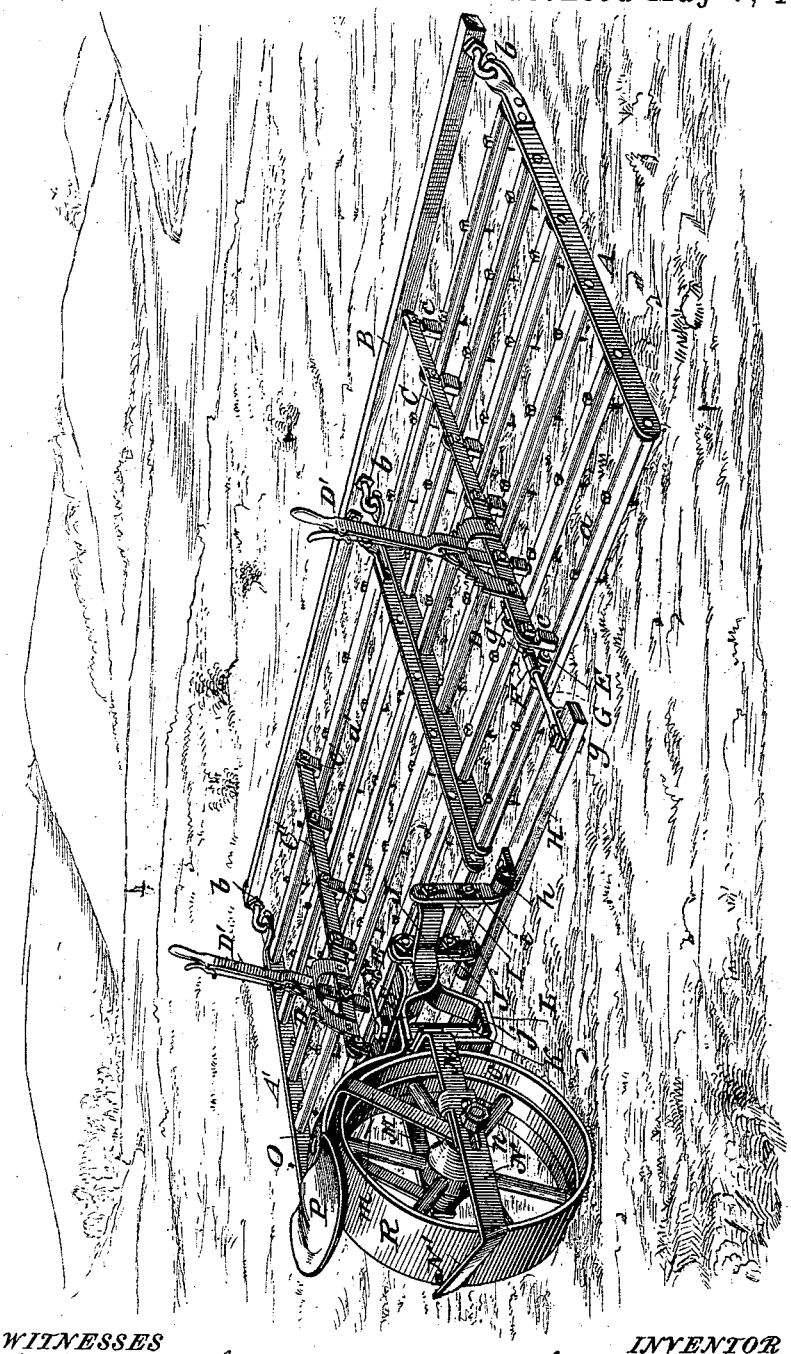

(No Model.)
2 Sheets—Sheet 1.

T. P. NAVIN.
HARROW.

No. 538,692.
Patented May 7, 1895.

WITNESSES
Fred G. Dieterich
W. C. Keegin

INVENTOR
Thomas P. Navin
by Holcomb & Johnston
Attorneys.

(No Model.) 2 Sheets—Sheet 2.
T. P. NAVIN.
HARROW.
No. 538,692. Patented May 7, 1895.
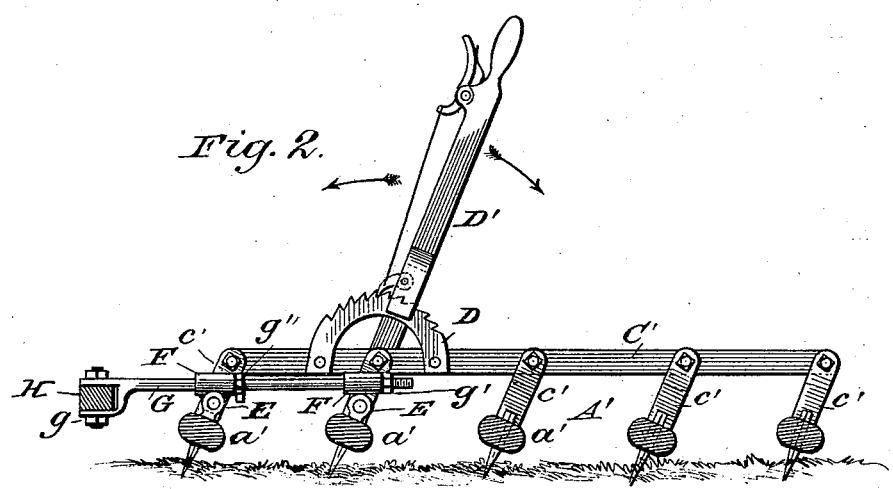
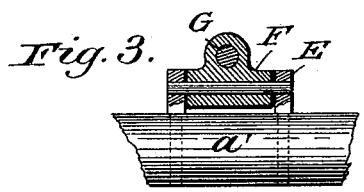
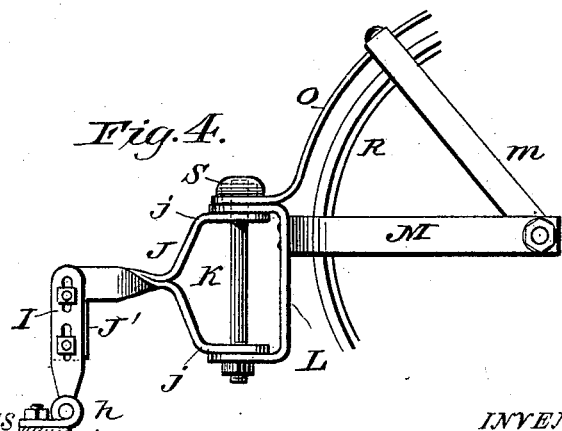
WITNESSES
Fred G. Dieterich
W. C. Keegin
INVENTOR
Thomas P. Navin
by Holcomb & Johnston
Attorneys.

UNITED STATES PATENT OFFICE.

THOMAS P. NAVIN, OF MITCHELL, ASSIGNOR OF THREE-FOURTHS TO JAMES TOBIN, JAMES H. TOBIN, AND JOHN F. CRAIG, OF DAVISON COUNTY, SOUTH DAKOTA.

HARROW.

SPECIFICATION forming part of Letters Patent No. 538,692, dated May 7, 1895.

Application filed December 18, 1894. Serial No. 532,151. (No model.)

*To all whom it may concern:*

Be it known that I, THOMAS P. NAVIN, a citizen of the United States, residing at Mitchell, in the county of Davison and State of South Dakota, have invented certain new and useful Improvements in Harrows; and I do hereby declare the following to be a full, clear, and exact description of the invention, such as will enable others skilled in the art to which it appertains to make and use the same.

My invention relates to harrows, and is designed as an improvement on Letters Patent No. 511,025, granted to me December 19, 1893.

It consists, first, in certain improvements in riding attachments for harrows; second, in means whereby the angle of the teeth may be simultaneously, easily and quickly adjusted from the perpendicular either to the front or rear; third, in means whereby the separate sections of the harrow are enabled to separately and independently adjust themselves to the inequalities of the surface of the ground; also, in certain details of construction and arrangement of parts hereinafter more specifically described in the specification, illustrated in the drawings, and pointed out in the claims.

In the drawings, Figure 1 is a perspective view of my improved harrow when complete and ready for operation. Fig. 2 is a vertical section through the harrow proper, showing in side elevation the lever, oscillating bar, and ratchet by means of which the teeth bars or beams are rotated and the angle of the teeth adjusted, also showing the automatically-adjustable connection between the harrow and riding attachment. Fig. 3 is a detail showing in vertical section one of the thimbles in which the connecting-rod is secured upon the harrow-beam. Fig. 4 is a detail in side elevation of the riding attachment.

The harrow proper is preferably composed of two rectangular sections A, A', having a draft-beam, B, in front, common to both, and to which the harrow sections are connected by the hooks, b. The harrow sections are formed of the transverse side bars, preferably composed of metal and provided with circular openings to receive the ends of the longitudinal tooth beams, a'. These beams are provided with metallic spindles or arbors in their ends to fit the openings in the side bars, and enable the tooth beams to rotate freely. Each beam is provided at or near its center with a short upright stud, c'. These studs are arranged in a line parallel with the sides and provided at their tops with an aperture to receive a bolt, by means of which they are pivotally connected with the transverse bar, C', as shown in Fig. 2. Upon this bar, near its inner end, is secured a semi-circular or curved ratchet, D, and embracing this ratchet and pivotally bolted to the bar, C, is an upright lever, D', which lever is integral with, or a prolongation of, one of the studs in a tooth beam, and is provided with a spring controlled pawl to engage with the ratchet D. Upon the last two tooth beams are pivotally mounted, by means of eye bolts, E, near the center of each section, thimbles, F, to receive the connecting rod G, by means of which the harrow sections are connected with the riding attachment in the rear. This connecting rod is cylindrical in form to enable it to rotate within the thimbles; is provided at its inner end with a retaining nut, g', and between the thimbles with a set nut, g'', to limit its horizontal movement and adapt it to harrows with the space between the beams of differing widths. This rod terminates at its outer end in a clevis, g, which embraces the end of the ground bar, H, of the riding attachment, and is secured thereto by a bolt and nut.

R, is the wheel of the riding attachment, which is of any suitable and convenient size, and formed with a broad tread to prevent it from sinking into soft ground. Like that in my former patent, referred to, it is mounted in a main frame so attached to the harrow by pivotal connections as to follow without interfering with the free movement of the harrow.

The main frame is composed of the U-shaped piece, M, having its extremities at its open end perforated to receive the ends of the axle of the wheel. To its closed end is securely bolted, at right angles, a clevis-shaped piece, L, having its ends perforated to receive the vertical bolt, K. This bolt serves to secure to the frame the seat-supporting spring, O, the foot of which rests beneath its head, S, upon the upper end of the piece L, and also serves as a pivot for the rear end of the coupler, J. This coupler is composed of two L-shaped strips of metal united about midway of the longer arm. Their ends are separated and the coupler then given a half twist at the united point, so that the open ends occupy a plane at right-angles with each other. The rear ends, j, of the coupler which are perforated, are then passed within the clevis piece L of the wheel frame, and pivotally secured in place by the bolt, K. The forward ends having the right-angled downward projection, J', provided with two or more perforations in each, are secured by bolts to slotted uprights, I, pivotally secured on the upper face of the ground bar, H, by the hinge, h. By this construction the coupling is rendered adjustable to harrows of different heights, and a more nearly uniform and direct contact with the surface of the ground is maintained by all the harrow teeth.

m, is a clevis or U-shaped spring support, having its open end journaled at each side of the wheel upon the axle, and its closed end extending beyond the rim of the wheel beneath the spring o, and secured to the latter by a screw or bolt. It is adapted to move radially over the wheel beneath the spring, which latter is provided with a series of openings or perforations, whereby the support m, may be secured at any desired point for the purpose of regulating the resiliency of the spring, and remedy a defect in my former construction shown in Patent No. 511,025, wherein the resiliency of the spring is found at times to be too great when passing over rough surfaces. I have also found that when the foot support is secured to the spring as shown in my former patent, sufficient room is not afforded for the legs between the seat P, and foot-rest. Hence I prefer to locate the latter upon the foot of the spring beneath the bolt head S, as shown in Fig. 1.

N', represents a mud scraper, intended to clear the face of the wheel of mud, clay or other substances that may adhere to it, and is composed of a forwardly extending arm, N, provided with a longitudinal slot, n, through which one end of the wheel-axle projects, and it is secured in place by the nut, o. It is also provided at its inner end with ears or flanges embracing the frame piece M, whereby, and by means of the slot, n, it is adapted to slide horizontally backward or forward. Its outer end forms the scraper proper, N', and is turned to an angle parallel with the face of the wheel but in an upwardly oblique direction, having its lower edge inclined inwardly.

In operating my device, the team is attached to the draft bar B, the teeth having been adjusted to the required angle by means of the ratchet D and lever D'. As the harrow is drawn over the ground, the rear end of each section is held down by its connection with the ground-bar H, of the riding attachment, but a free vertical movement is permitted at each side of the center to conform to uneven surfaces by means of the oscillatory connecting rod, G, and its bearings.

When deep cultivation is desired, the angle of the teeth may be adjusted toward the front, or if only a shallow cultivation is required, they are adjusted to a rearward inclination. In fact they may be so far inclined to the rear as to almost wholly prevent any irritation of the surface when moving the harrow over the ground from one field to another, and the teeth may be quickly and easily cleared when clogged without stopping the team.

Having thus described my invention, what I claim, and desire to secure by Letters Patent, is—

1. The combination with a harrow, and the ground bar of the riding attachment, of the cylindrical connecting rod rotatably mounted in thimbles secured on the rear beams of the harrow at a point about midway of the ends, substantially as and for the purpose described.

2. The combination with a harrow, of the ground bar H, attached to its rear end by the cylindrical connecting rod rotatably secured at one end to the harrow beams, and at the opposite end to the ground bar by a clevis, and the riding attachment pivotally secured to the ground bar, substantially as and for the purpose described.

3. The combination in a harrow composed of two or more sections, of a draft bar flexibly attached to the front of each section, a ground bar pivotally connected with the rear of each section at a central point whereby vertical movement of said section is permitted on either side of said pivotal point, and a riding attachment flexibly and adjustably connected with the ground bar, substantially as and for the purpose described.

4. The combination with the ground bar H, and coupler J, of the slotted uprights I, pivotally secured to the ground bar, whereby the riding attachment may be adjusted to harrows of different heights, substantially as and for the purpose described.

5. The combination in a wheel harrow constructed as described, with the wheel-frame and the seat supporting springs; of the inverted U-shaped radially adjustable spring-support m, having its open end pivotally secured to the axle, and its closed end adapted to connect with the spring, whereby its connection with the latter may be adjusted so as to control the resiliency of the spring, substantially as set forth.

6. The combination with the rear rotatably journaled tooth beams, and the cylindrical connecting rod G, of the thimbles F, pivotally secured to said tooth beams, substantially as and for the purpose described.

In testimony whereof I affix my signature in presence of two witnesses.

THOMAS P. NAVIN.

Witnesses:
J. F. CRAIG,
JAMES H. TOBIN.